(12) United States Patent
Kano

(10) Patent No.: US 6,840,670 B2
(45) Date of Patent: Jan. 11, 2005

(54) APPARATUS AND METHOD FOR NON-CONTACT TEMPERATURE MEASUREMENT

(75) Inventor: Shiro Kano, Tokyo (JP)

(73) Assignee: Yamatake Corporation, Tokyo (JP)

( * ) Notice: Subject to any disclaimer, the term of this patent is extended or adjusted under 35 U.S.C. 154(b) by 440 days.

(21) Appl. No.: 09/997,065

(22) Filed: Nov. 29, 2001

(65) Prior Publication Data

US 2002/0130789 A1 Sep. 19, 2002

(30) Foreign Application Priority Data

Dec. 1, 2000 (JP) .......................................... 2000-367070

(51) Int. Cl.$^7$ ................................................ G01K 1/16
(52) U.S. Cl. ....................................................... 374/121
(58) Field of Search ............................... 600/486, 316; 374/121

(56) References Cited

U.S. PATENT DOCUMENTS 6,264,611 B1 * 7/2001 Ishikawa et al. ............ 600/486
6,330,464 B1 * 12/2001 Colvin et al. ................ 600/316

FOREIGN PATENT DOCUMENTS

| JP | 6-341905 A | 12/1994 |
| JP | 11-248539 A | 9/1999 |
| JP | 2000-241257 A | 9/2000 |

* cited by examiner

*Primary Examiner*—John F. Niebling
*Assistant Examiner*—Andre' C. Stevenson
(74) *Attorney, Agent, or Firm*—Frishauf, Holtz, Goodman & Chick, P.C.

(57) ABSTRACT

A non-contact temperature measuring apparatus is provided with spherical semiconductors mounted on a measurement object and a data collector disposed out of contact with the measurement object. Each spherical semiconductor has an electronic circuit which is operable using internal power created from electromagnetic energy supplied from the data collector, to thereby obtain temperature information. The data collector contactlessly determines a temperature of or a temperature distribution across the measurement object based on pieces of temperature information transmitted from the spherical semiconductors specified by pieces of identification information sequentially transmitted from the data collector.

7 Claims, 3 Drawing Sheets

APPARATUS AND METHOD FOR NON-CONTACT TEMPERATURE MEASUREMENT

BACKGROUND OF THE INVENTION

1. Technical Field

The present invention relates to a non-contact temperature measurement, and more particularly, to an apparatus and a method for non-contact temperature measurement capable of contactlessly, easily and efficiently measuring the temperature of and/or the temperature distribution throughout a measurement object.

2. Related Art

There has been a demand in various fields that the temperature of a measurement object be accurately measured. In a semiconductor manufacturing apparatus where a semiconductor wafer is subject to various processes, an accurate temperature management of a wafer is important to permit the apparatus to fully exhibit its performance to attain an improved yield.

For temperature measurement of a semiconductor wafer, apparatuses of contact type and non-contact type are known as disclosed in Japanese provisional patent publication nos. 2000-241257, 6-341905 and 11-248539.

Specifically, a contact-type temperature measuring apparatus is provided with thermocouples that are formed on a semiconductor wafer together with conductive lines and a connector. The thermocouples are connected through the conductive lines and the connector to an extension cable. In measuring the temperature of the wafer, outputs of the thermocouples are supplied to an external measuring instrument through the conductor lines, connector and extension cable.

Thus, the contact-type apparatus requires signal lines corresponding in number to the thermocouples, resulting in a complicated structure. In addition, countermeasures must be taken for preventing extraneous noise from entering into the signal lines to improve the measurement accuracy. In a case where a temperature measurement be made on a rotating semiconductor wafer, a signal cable hinders the wafer from rotating, making it impossible to carry out the measurement.

On the contrary, a non-contact type temperature measuring apparatus is free from problems caused by a signal cable since it is provided with sensors for contactlessly measuring the surface temperature of a semiconductor wafer based on a temperature-dependent thermal emittance or light transmittance of the wafer. However, such an apparatus entails another problem of how to remove the influence of individual differences between semiconductor wafers. Moreover, countermeasures must be taken such as to protect a semiconductor wafer from a thermal source or extraneous light affecting on the measurement accuracy.

To remove a signal cable, still another attempt may be made to use a transmitter for wirelessly transmitting outputs of thermocouples. In such an arrangement, however, difficulties will be encountered in mounting a semiconductor wafer with a transmitter and a battery serving as a drive source thereof. The usage of a battery entails problems such as heat generation and short battery life.

SUMMARY OF THE INVENTION

An object of the present invention is to provide an apparatus and a method for non-contact temperature measurement capable of contactlessly, easily and accurately measuring, with a simplified construction, the temperature of and/or the temperature distribution throughout a measurement object such as a semiconductor wafer.

According to one aspect of the present invention, there is provided a non-contact temperature measuring apparatus which comprises spherical semiconductors mounted to a measurement object and each having a surface thereof integratedly formed with an electronic circuit and mounted with a coil, and a data collector disposed out of contact with the spherical semiconductors for supplying the spherical semiconductors with electric power required to operate the electronic circuits and for collecting pieces of temperature information transmitted from the spherical semiconductors.

The electronic circuit of each spherical semiconductor is provided with a memory for storing identification information proper to the spherical semiconductor; a power source section for generating internal power, required to operate the electronic circuit, from electromagnetic energy received through the coil from outside; a sensing circuit including a thermosensitive element responsive to a temperature of the measurement object; and a transmitter for transmitting, as the temperature information, an output of the sensing circuit through the coil when the identification information stored in the memory is specified by the data collector.

The data collector is provided with an energy source for generating electromagnetic energy; a transmitter for transmitting identification information to specify an arbitrary one of the spherical semiconductors; and a receiver for detecting the temperature information transmitted from the specified spherical semiconductor.

As described above, the non-contact temperature measuring apparatus of this invention is provided with the spherical semiconductors mounted to the measurement object and each having the electronic circuit which is operated by electromagnetic energy received from the data collector and which is configured to transmit temperature information, indicative of the temperature of the measurement object, to the data collector. This makes it possible to contactlessly measure the temperature of the measurement object, without the need of using signal lines extending from the measurement object. In addition, the thermosensitive elements of the spherical semiconductors can be disposed in contact with or embedded into the measurement object, whereby an accurate temperature measurement can be made without being affected by external influence, noise and the like.

According to the present invention, moreover, the spherical semiconductors can be operated simultaneously and pieces of temperature information can be collected therefrom in sequence, whereby an efficient temperature measurement can be made with ease, and the temperature distribution throughout the measurement object can be also determined.

In this invention, preferably, the coil and the thermosensitive element mounted on each spherical semiconductor are disposed diametrically opposite to each other.

Preferably, the measurement object is a semiconductor wafer. The thermosensitive element is embedded into a surface layer of the semiconductor wafer. In this arrangement, the thermosensitive element is in direct contact with the surface layer of the semiconductor wafer, whereas the coil mounted on the spherical semiconductor is located apart from the surface layer of the semiconductor wafer.

Preferably, the memory of each spherical semiconductor is a nonvolatile memory that retains the identification information even when the internal power disappears.

Each of the preferred arrangements is advantageous in that the measurement accuracy and operational reliability of the non-contact temperature measuring apparatus can be improved.

According to another aspect of the present invention, there is provided a non-contact temperature measuring method in which the aforementioned non-contact temperature measuring apparatus is used. This method comprises the steps of: (a) substantially uniformly distributing the spherical semiconductors of said apparatus on the measurement object; (b) simultaneously supplying the spherical semiconductors with electric power from the data collector of said apparatus, to thereby permit the spherical semiconductors to detect temperatures of different points on the measurement object; (c) contactlessly collecting, by the data collector, pieces of temperature information indicative of the detected temperatures and transmitted from the spherical semiconductors; and (d) determining temperatures of or the temperature distribution throughout the measurement object based on the pieces of temperature information by the data collector.

With the aforementioned method and the following preferred embodiments thereof, the temperature of and/or the temperature distribution throughout a measurement object can be contactlessly, easily and accurately measured.

In the present invention, preferably, said step (a) includes disposing one of the spherical semiconductors at the center of a surface of a semiconductor wafer serving as the measurement object and disposing the remaining spherical semiconductors at equal angular intervals on the circumference of at least one imaginary circle centered at the center of the surface of the semiconductor wafer, and said step (b) includes detecting surface temperatures of different points on the semiconductor wafer.

Preferably, said step (c) includes sequentially collecting pieces of identification information which are proper to the spherical semiconductors, respectively, and each of which is transmitted from a corresponding one of the spherical semiconductors together with the temperature information, and said step (d) includes determining the temperature distribution throughout the measurement object in accordance with the pieces of temperature information and the pieces of identification information.

Preferably, said step (c) includes correcting the temperature information to be transmitted from each spherical semiconductor in accordance with temperature correction information determined for each spherical semiconductor, the temperature correction information being determined from the output of the sensing circuit of the spherical semiconductor in a condition that the measurement object mounted with the spherical semiconductors is placed in a predetermined temperature circumstance.

DETAILED DESCRIPTION

With reference to the appended drawings, a non-contact temperature measuring apparatus according to an embodiment of this invention will be described, along with a non-contact temperature measuring method using the same.

Figure 1:
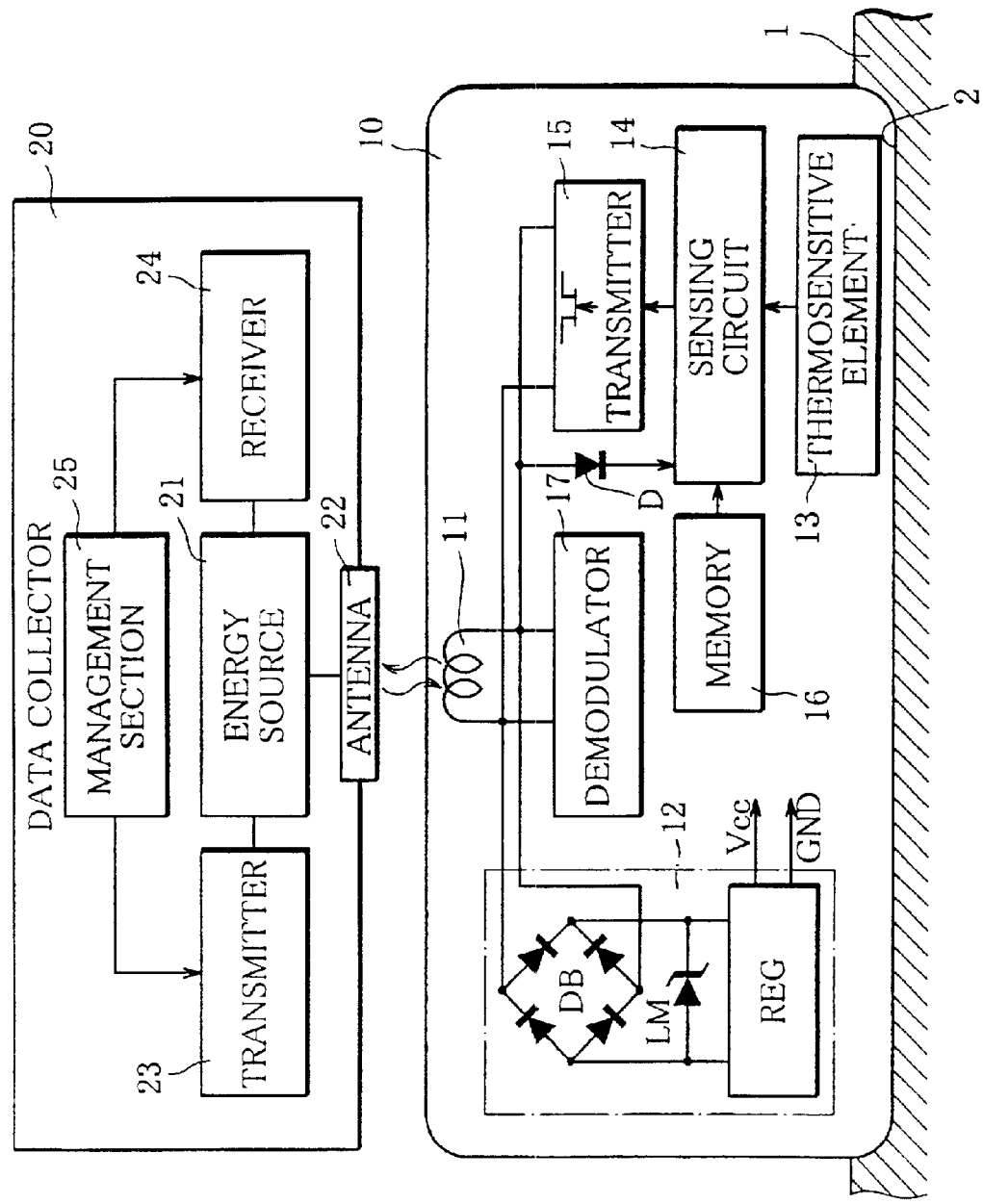
FIG. 1 is a block diagram schematically showing a non-contact temperature measuring apparatus according to an embodiment of the present invention.

As shown in FIG. 1, the non-contact temperature measuring apparatus of this embodiment comprises spherical semiconductors (one of which is shown by reference numeral 10 in FIG. 1) mounted on a temperature measurement object such as a semiconductor wafer 1, and a data collector 20 for contactlessly supplying the spherical semiconductors 10 with electromagnetic energy and for contactlessly collecting pieces of temperature information transmitted from the spherical semiconductors 10.

The data collector 20 comprises an energy source 21 for generating electromagnetic energy, and an antenna 22 through which the electromagnetic energy is emitted to a space in which the spherical semiconductors 10 are disposed. The electromagnetic energy has a frequency ranging from about several hundred KHz to several ten MHz, and produces an induction field in the aforesaid space. The induction field induces AC power in the coil 11 of each spherical semiconductor 10, whereby the spherical semiconductors 10 are supplied with electromagnetic energy.

The data collector 20 further comprises a transmitter 23 for transmitting transmission data including a process command and an ID number, a receiver 24 for detecting pieces of temperature information transmitted from the spherical semiconductors 10, and a data collection management section 25 for specifying an arbitrary one of the spherical semiconductors 10 and for controlling operations of the transmitter 23 and the receiver 24.

When transmitting the transmission data, the transmitter 23 modulates the electromagnetic energy generated by the energy source 21 in accordance with data to be transmitted, thereby superimposing transmission data on the electromagnetic energy. The electromagnetic energy carrying the transmission data is transmitted from the antenna 22. Amplitude shift keying (ASK) or frequency shift keying (FSK) modulation system may be adopted for the electromagnetic energy modulation.

The receiver 24 detects, as temperature information, a minute change in the induction field produced by a spherical semiconductor 10. The temperature information is superimposed on the induction field, as mentioned later. In this embodiment, the temperature information represents a temperature of a semiconductor wafer (more generally, a measurement object) which is measured by a thermosensitive element 13 of the spherical semiconductor 10. The temperature information detected by the receiver 24 is delivered to a data collection management section 25 in which a temperature distribution throughout the semiconductor wafer is determined based on pieces of temperature information and ID numbers. These ID numbers serve as pieces of identification information to specify the spherical semiconductors 10, respectively.

The spherical semiconductor 10 is mainly constituted by a spherical semiconductor element of about 1 mm diameter having a spherical surface thereof formed with an electronic circuit and a coil 11. The electronic circuit is integratedly formed on the surface of the semiconductor element by an IC process generally employed for the fabrication of C-MOS or the like. The coil 11 may be constituted by several turns of conductor formed by vapor deposition, photolithography or the like on an insulator such as an oxidized film that covers the surface of the semiconductor element on which the electronic circuit is formed.

Specifically, the electronic circuit comprises a power source section 12 for generating internal power Vcc, required to operate the electronic circuit, from the electromagnetic energy (AC power) supplied from the data collector 20 and received through the coil 11; a thermosensitive element 13 for generating an output that corresponds to the surface temperature of the semiconductor wafer 1; a sensing circuit 14 for detecting the temperature information from the output of the thermosensitive element 13; and a transmitter 15 for transmitting the temperature information through the coil 11.

The electronic circuit further comprises a nonvolatile memory 16 for storing identification information (an ID number in this embodiment) proper to the spherical semiconductor 10, and a demodulator 17 for demodulating a modulated component of the electromagnetic energy to detect the transmission data such as a command transmitted from the data collector 20. Although the temperature information detected by the sensing circuit 14 can be stored in the memory 16, another memory for storing the temperature information and the like may be provided.

As exemplarily shown in FIG. 1, the power source section 12 is comprised of a diode bridge DB for subjecting the electromagnetic energy (AC power) received through the coil 11 to full-wave rectification, a limiter LM for regulating or limiting the output voltage of the diode bridge DB, and a regulator REG for receiving the output voltage of the diode bridge DB to generate a stabilized internal voltage Vcc. The limiter LM may be comprised of a zener diode, a shunt regulator or the like. Instead of the diode bridge DB for subjecting the AC power to full-wave rectification, a semi-wave rectifying circuit may be used.

Figure 2:
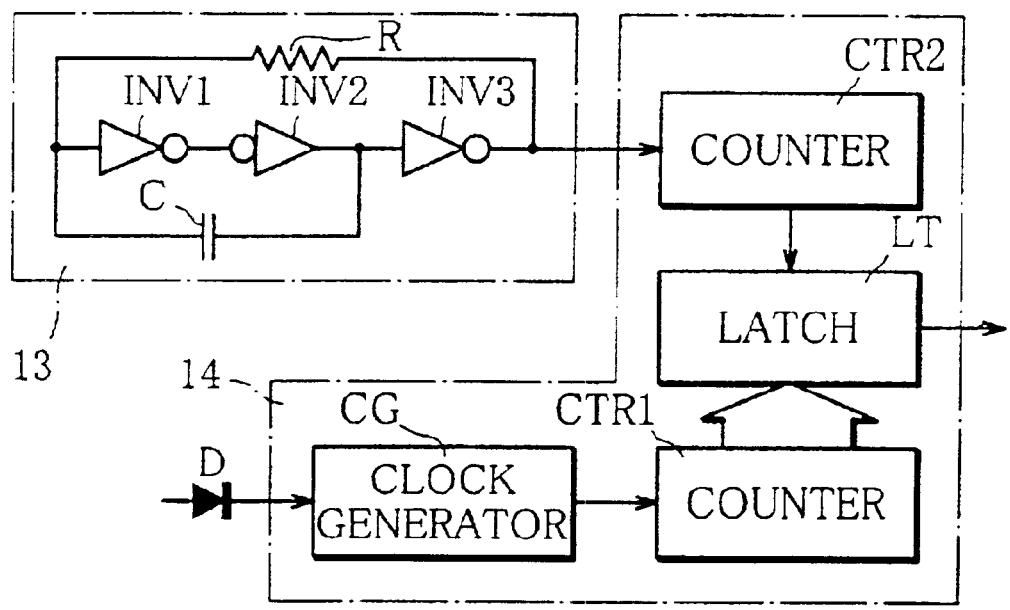
FIG. 2 is a block diagram exemplarily showing the construction of a thermosensitive element and a sensing circuit of the apparatus shown in FIG. 1.

The thermosensitive element 13 and the sensing circuit 14 are configured as exemplarily shown in FIG. 2. Specifically, the thermosensitive element 13 is comprised of a ring oscillator that includes a resistor R and a capacitor C, which serve as a thermosensitive element, and series-connected inverters INV1, INV2 and INV3. The ring oscillator is arranged to negative-feedback the output of the inverter INV3 to the inverter INV1 through the resistor R and positive-feedback the output of the inverter INV2 to the inverter INV1 through the capacitor C. Both the resistance of the resistor R and the capacitance of the capacitor C vary depending on temperature to cause feedback ratios to change, so that the ring oscillator may have a variable oscillating frequency (oscillating period) to serve as a thermosensitive circuit.

The sensing circuit 14 for detecting the temperature information from the output of the thermosensitive element 13 is comprised of a clock generator CG for generating a reference clock signal of a predetermined frequency from a frequency component that is extracted from AC power received through the coil 11; a first counter CTR1 for counting the reference clock signal to determine a predetermined time period and for outputting a latch signal each time the predetermined time period has elapsed; a second counter CTR2 for counting the output of the thermosensitive element (ring counter) 13; and a latch circuit LT for latching the count in the second counter CTR2 when it receives the latch signal from the first counter CTR1. The sensing circuit 14 outputs the count latched by the latch circuit LT as temperature information indicative of the surface temperature of the semiconductor wafer 1 detected by the thermosensitive element 13.

Meanwhile, in a case where the frequency of the reference clock signal is sufficiently higher than the oscillating frequency of an output signal of the ring oscillator 13, the number of times of counting the ring oscillator output in the predetermined time period by the second counter CRT2 may be increased. As in the embodiment, the count in the second counter CTR2, i.e., the temperature information, is latched by and output from the latch circuit LT.

With use of a diode D, the clock generator CG carries out the half-wave rectification of the AC power received through the coil 11 and the wave-shaping of the resultant half-wave output, thereby generating the reference clock signal of a predetermined frequency. Although a quartz oscillator may be used instead of the clock generator CG, this would entail drawbacks such as a complicated construction.

The transmitter 15, comprised of a field-effect transistor (FET) connected in parallel with the coil 11, is arranged to change the Q value (impedance) of the coil 11 by changing the resistance of the FET in accordance with the output of the sensing circuit 14, whereby the electromagnetic energy (induction field) is modulated and the output of the sensing circuit 14 carried on the electromagnetic energy is transmitted. Specifically, the transmitter 15 encodes the aforesaid count (temperature information) by means of Bi-phase encoding or Manchester encoding, and adds a cyclic Redundancy check (CRC) code or the like thereto. By doing this, transmission data to be transmitted through the coil 11 is created. The transmitter 15 may be arranged to read out the identification information or ID number from the nonvolatile memory 16 and transmit the same together with the temperature information.

Figure 3:
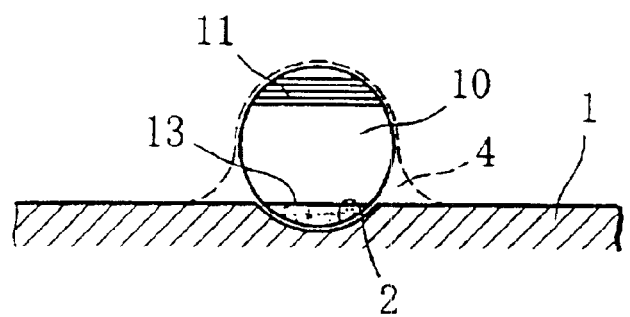
FIG. 3 is a schematic front view showing, partly in cross section, a spherical semiconductor mounted on a surface of a semiconductor wafer, together with a positional relationship between the thermosensitive element and a coil formed on the spherical semiconductor.

The spherical semiconductor 10 provided with the electronic circuit and the coil 11 is mounted to the semiconductor wafer 1 serving as the measurement object, and is used for temperature measurement in respect of the semiconductor wafer 1. To be noted, in the spherical semiconductor 10, the thermosensitive element 13 and the coil 11 are disposed diametrically opposite to each other, as shown in FIG. 3. Specifically, the coil 11 and the thermosensitive element 13 are positioned on different semispherical surfaces of the spherical semiconductor element, which is the main constituent of the spherical semiconductor 10.

When mounted on the semiconductor wafer 1, the spherical semiconductors 10 are oriented such that their thermosensitive elements 13 are permitted to be fitted or embedded into recesses 2 which are individually formed beforehand in temperature measurement points of the semiconductor wafer 1, as exemplarily shown in FIGS. 1 and 3. The spherical semiconductors 10 are adhered to the semiconductor wafer 1 with epoxy adhesive applied to the recesses 2. Alternatively, the entire of the spherical semiconductors 10 is covered with adhesive 4, as shown by dotted line in FIG. 3, so that the spherical semiconductors 10 may be fixed to the semiconductor wafer 1.

With the above arrangement where the thermosensitive elements 13 of the spherical semiconductors 10 are embedded in a surface layer of the semiconductor wafer 1, the outputs of the thermosensitive elements 13 accurately indicate the temperatures of the measurement points on the semiconductor wafer 1. This arrangement is also advantageous in that the thermosensitive elements are hardly affected by air streams flowing along the surface of the semiconductor wafer 1.

On the other hand, the coils 11 of the spherical semiconductors 10 are disposed to project from the surface of the semiconductor wafer 1 so as to be oriented toward the antenna 22 of the data collector 20. Thus, the coils 11 are strongly coupled to the induction field formed by the data collector 20, and the electromagnetic energy is hardly blocked by the semiconductor wafer 1. As a result, the coils 11 are ensured of receiving the electromagnetic energy, whereby a reliable operation of the spherical semiconductors 10 can be achieved.

In the embodiment, a plurality of spherical semiconductors 10 are employed for temperature measurement at different points on the semiconductor wafer 1. This is because the semiconductor wafer 1 ordinarily having 4- or 8-inch diameter has a wide area as compared to the spherical semiconductor 10 which is about 1 mm in diameter. With use of a single spherical semiconductor 10, the temperature can be detected solely for a given one point on the semiconductor wafer 1. This applies to a temperature or temperature distribution measurement in respect of a measurement object having a large area.

Figure 4:
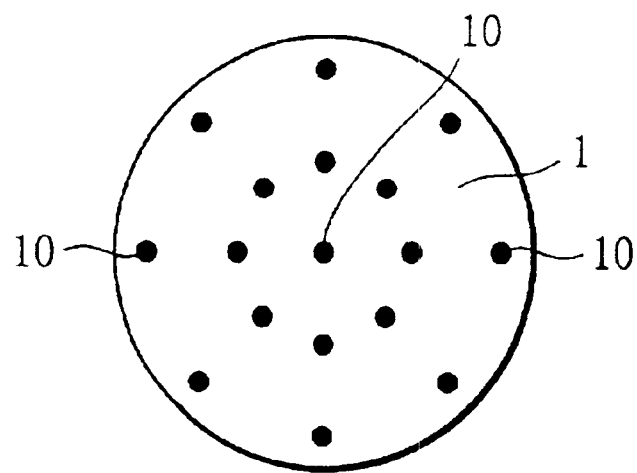
FIG. 4 is a plan view showing an example of the arrangement of spherical semiconductors on a semiconductor wafer.

Preferably, as shown in FIG. 4, one of the spherical semiconductors 10 is disposed at the center of the semiconductor wafer 1 and the remaining spherical semiconductors 10 are disposed at equal angular intervals on the circumferences of imaginary circles centered at the center of the wafer. It is preferable to dispose the spherical semiconductors 10 substantially uniformly on the semiconductor wafer 1 in the above manner. As for a rectangular measurement object such as an oxygen electrode or a hydrogen electrode of a fuel cell, spherical semiconductors 10 may be arranged in squares on the measurement object.

Figure 5:
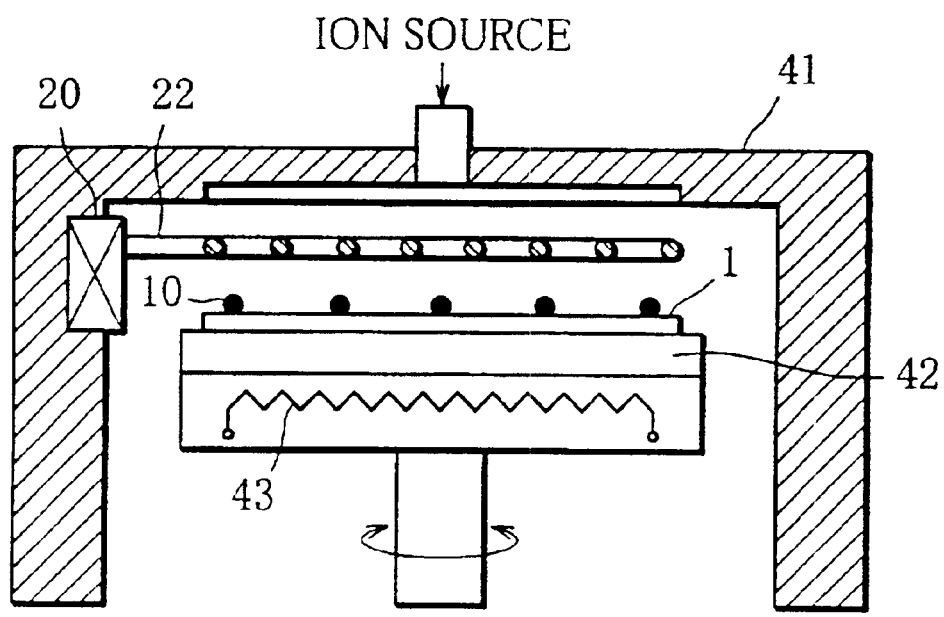
FIG. 5 is a schematic front view showing, partly in cross section, an example of the non-contact temperature measuring apparatus arranged in a semiconductor manufacturing apparatus.

For the temperature measurement of semiconductor wafers that are subjected to heating in a semiconductor manufacturing apparatus, a semiconductor wafer 1 for temperature measurement is prepared in advance which corresponds to the aforesaid semiconductor wafer mounted with the spherical semiconductors 10. Such a semiconductor wafer 1 is disposed in a chamber 41 of the semiconductor manufacturing apparatus as shown in FIG. 5. In FIG. 5, reference numeral 42 denotes a rotary table (specimen support) on which the semiconductor wafer 1 is placed, and 43 denotes a heater serving as a heating source embedded in the rotary table 42.

As shown in FIG. 5, the data collector 20 for supplying the spherical semiconductors 10 with electromagnetic energy is disposed in such a manner that the antenna 22 is placed above the rotary table 42 so as to be opposed to the upper surface of the semiconductor wafer 1. The antenna 22 is configured to have an effective diameter larger than the diameter of the semiconductor wafer 1, to thereby simultaneously supply the spherical semiconductors 10 with electromagnetic energy, in other words, to generate an induction field over the entire region in which the spherical semiconductors 10 are dispersedly disposed.

Then, electromagnetic energy is supplied from the data collector 20 to the spherical semiconductors 10 to render them operative, whereupon the temperature measurement is started.

By conducting the temperature measurement with use of the semiconductor wafer 1 mounted with the spherical semiconductors 10 and disposed in the chamber 41 of the semiconductor manufacturing apparatus, it is possible to easily measure a temperature change of or a temperature distribution throughout the semiconductor wafer 1 heated by the heater 43. Therefore, actual manufacturing conditions in the semiconductor manufacturing apparatus under which semiconductor devices such as integrated circuits are fabricated can be accurately and easily determined. Also, temperatures of the semiconductor wafer 1 at various points can be measured simultaneously, and the resultant pieces of temperature data can be collected and analyzed by the data collector 20. With use of the resulting analysis information, the conditions of operation of the semiconductor manufacturing apparatus can be properly controlled.

Meanwhile, in the temperature measurement using spherical semiconductors 10 mounted on the semiconductor wafer 1, it is preferable to correct the outputs of the thermosensitive elements 13 or the sensing circuits 14 of the spherical semiconductors 10. This is because the thermosensitive elements 13 constituted by a ring oscillator would entail a variation in thermosensitive characteristic due to fabrication condition differences and/or individual differences thereof. Further, output characteristics (measurement characteristics) of the spherical semiconductors 10 can vary depending on their mounted position and/or manners of mounting thereof. Such a problem can occur not only in ring oscillators but also in temperature sensors or other thermosensitive elements fabricated by an ordinary IC process.

In order to eliminate the aforesaid problem, the outputs of thermosensitive elements 13 are corrected, by way of example, in the following manner.

First, the semiconductor wafer 1 mounted with spherical semiconductors 10 is placed in a predetermined temperature circumstance such as a constant-temperature bath (not shown), which is set at a temperature of, e.g., 25° C. After the temperature of the semiconductor wafer 1 is stabilized in the constant-temperature bath, electromagnetic energy is supplied from the data collector 20 to the spherical semiconductors 10 to render them operative. In each spherical semiconductor 10, an output of the thermosensitive element 13 is stored as temperature correction information in the memory 16.

Incidentally, bath-temperature information indicative of a temperature detected by a high-accuracy temperature sensor (not shown) provided in the constant-temperature bath may be transmitted to the spherical semiconductors 10 through the data collector 20, so as to store such information in the memories 16.

Next, an actual temperature measurement is carried out in, e.g., a semiconductor manufacturing apparatus. In the temperature measurement, a temperature is measured by the thermosensitive element 13 of each spherical semiconductor 10, and the temperature correction information determined beforehand under the predetermined temperature circumstance is read out from the memory 16. In the sensing circuit 14, temperature information corresponding to the measured temperature is corrected with the temperature correction information. The corrected temperature information indicative of an accurate temperature value is transmitted from the transmitter 15 to the data collector 20. Alternatively, both the temperature information and the temperature correction information may be transmitted from the spherical semiconductor 10 to the data collector 20, thereby permitting the data collection management section 25 of the data collector 20 to correct the temperature information with the temperature correction information.

In this manner, the temperature information detected by each spherical semiconductor 10 is corrected by use of a corresponding one of pieces of temperature correction information that have been determined for the individual spherical semiconductors 10 under the predetermined temperature circumstance in which the measurement object (semiconductor wafer 1) was placed after being mounted with the spherical semiconductors 10. This makes it possible to suppress not only a variation in measurement characteristics of the spherical semiconductors 10 but also a variation in their output characteristics due to differences between mounted positions thereof on the measurement object. Thus, the accuracy of temperature measurement can be improved.

Meanwhile, output values of the thermosensitive element individually obtained under temperature circumstances of different temperatures may be stored as pieces of temperature correction information in the memory 16 of each spherical semiconductor 10. By using a lot of temperature correction information, it is possible to determine a more accurate relationship between thermosensitive element output (temperature information) and temperature, whereby the temperature information can be more accurately corrected to achieve a highly accurate temperature measurement.

In a case where the spherical semiconductors 10 are simultaneously supplied with electromagnetic energy, they are permitted to carry out the temperature measurement at the same time. In this case, it is preferable that, with use of ID numbers proper to individual spherical semiconductors 10, pieces of temperature information obtained by the spherical semiconductors 10 are collected sequentially by the data collector 20 as follows: First, an ID number that specifies a selected one of the spherical semiconductors 10 is carried on the electromagnetic energy and transmitted from the data collector 20. Each spherical semiconductor 10 receives the ID number transmitted from the data collector 20 and compares the received ID number with an ID number registered in the memory 16. Only the spherical semiconductor 10 whose registered ID number coincides with the received ID number transmits the temperature information.

By transmitting an ID number which specifies a selected one of the spherical semiconductors 10 as mentioned above, the data collector 20 can collect the temperature measurement data (temperature information) only from the specified spherical semiconductor 10, thereby preventing inconveniences such as interference from occurring, which would occur if two or more pieces of temperature measurement data are transmitted at one time. In accordance with the ID number, the data collector 20 can discriminate which spherical semiconductor 10 has transmitted the temperature measurement data. By determining in advance the relationship between the positions of the spherical semiconductors 10 on the semiconductor wafer 1 and the ID numbers individually assigned to the spherical semiconductors 10, the temperature distribution throughout the semiconductor wafer 1 can be accurately determined based on the relationship and the pieces of temperature measurement data.

By the way, an operation of storing the ID number into the memory 16 of each spherical semiconductor 10 may be performed during the fabrication or upon shipment of the spherical semiconductor or the semiconductor wafer mounted with spherical semiconductors. As for the management of ID number, ID numbers assigned to individual spherical semiconductors 10 may be registered in a management table (not shown) of the data collection management section 25 so as to correspond to the mounted positions of the spherical semiconductors 10 on the semiconductor wafer 1. With use of the management table stored with the ID numbers and mounted positions of the spherical semiconductors 10, the data collector 20 can specify a desired spherical semiconductor 10 from which the temperature data be collected by solely transmitting the corresponding ID number. This eliminates the need of making ID number transmission from a spherical semiconductor 10 each time the data collector 20 collects temperature data.

The present invention is not limited to the foregoing embodiment and may be modified variously.

In order to improve the accuracy of temperature measurement, the frequency of electromagnetic energy may be increased to increase the frequency of the reference clock signal used in the sensing circuit 14, or the predetermined time period may be lengthened during which the clock signal is counted by the counter CRT1, or the ring oscillator 13 may be configured to permit the oscillation frequency thereof to greatly change with the change in temperature.

The spherical semiconductor of the foregoing embodiment varies the Q value (impedance) of the coil 11 in accordance with temperature information to be transmitted. Alternatively, the spherical semiconductor may be adapted to radiate a radio wave carrying such temperature information.

In addition to the antenna 22 for transmitting electromagnetic energy, the data collector 20 may be provided with another antenna for receiving pieces of temperature information from spherical semiconductors 10. Such a data collector 20 can transmit the electromagnetic energy from the transmitting antenna 22 even when it is receiving temperature information through the receiving antenna. This permits the spherical semiconductors 10 to generate internal power Vcc with stability, thereby achieving a stable data transmission.

By increasing the number of spherical semiconductors 10 mounted on the semiconductor wafer 1, the temperature distribution throughout the semiconductor wafer can be more accurately determined.

In the case of a semiconductor wafer 1 made of silicon, contamination of the semiconductor wafer caused by spherical semiconductors being mounted thereto can be effectively prevented by using spherical semiconductors made of silicon.

In other respects, the present invention may be modified without departing from the scope of the invention.

What is claimed is:

1. A non-contact temperature measuring method for a non-contact temperature measuring apparatus,
    wherein the non-contact temperature measuring apparatus comprises:
        spherical semiconductors mounted to a measurement object, each spherical semicondunctor including a surface which is integratedly formed with an electronic circuit, and a coil mounted thereon; and
        a data collector, disposed out of contact with said spherical semiconductors, for supplying said spherical semiconductors with electric power required to operate each said electronic circuit and for collecting pieces of temperature information transmitted from said spherical semiconductors;
    wherein said electronic circuit of each spherical semiconductor comprises: (i) a memory for storing identification information proper to the spherical semiconductor; (ii) a power source section for generating internal power, required to operate said electronic circuit, from electromagnetic energy received through said coil from outside the spherical semiconductor; (iii) a sensing circuit including a thermosensitive object; and (iv) a transmitter for transmitting, as the temperature information, an output of said sensing circuit through said coil when the identification information stored in said memory is specified by said data collector; and
    wherein said data collector comprises (i) an energy source for generating the electromagnetic energy; (ii) a transmitter for transmitting identification information to specify an arbitrary one of said spherical semiconductors; and (iii) a receiver for detecting the temperature information transmitted from the specified spherical semiconductor;

said method comprising:

(a) substantially uniformly distributing the spherical semiconductors on the measurement object;

(b) simultaneously supplying the spherical semiconductors with electric power from the data collector, so as to power the spherical semiconductors to detect temperatures of different points on the measurement object;

(c) contactlessly collecting, by the data collector, pieces of temperature information indicative of the detected temperatures which is transmitted from the spherical semiconductors; and (d) determining, by the data collector, at least one of temperatures of the measurement object and a temperature distribution throughout the measurement object based on the pieces of temperature information;

wherein the temperature information to be transmitted from each spherical semiconductor is corrected in accordance with temperature correction information determined for each spherical semiconductor.

2. The non-contact temperature measuring method according to claim 1, wherein said coil and said thermosensitive element of the electronic circuit mounted on said each spherical semiconductor are disposed diametrically opposite to each other.

3. The non-contact temperature measuring method according to claim 1, wherein the measurement object comprises a semiconductor wafer, and wherein said thermosensitive element is embedded into a surface layer of the semiconductor wafer.

4. The non-contact temperature measuring method according to claim 1, wherein said memory of said each spherical semiconductor comprises a nonvolatile memory that retains the identification information even when the internal power is not present.

5. The non-contact temperature measuring method according to claim 1, wherein the measurement object comprises a semiconductor wafer, one of the spherical semiconductors is provided at a center of a surface of the semiconductor wafer, and remaining spherical semiconductors are distributed at equal angular intervals on a circumference of at least one imaginary circle centered at the center of the surface of the semiconductor wafer, and wherein surface temperatures are detected at different points on the semiconductor wafer.

6. The non-contact temperature measuring method according to claim 1, pieces of identification information which are respectively proper to the spherical semiconductors are transmitted from a corresponding one of the spherical semiconductors together with the temperature information and sequentially collected by the data collector, and wherein the temperature distribution throughout the measurement object is determined in accordance with the pieces of temperature information and the pieces of identification information.

7. The non-contact temperature measuring method according to claim 1, wherein the temperature correction information is determined based on an output of the sensing circuit of the spherical semiconductor when the measurement object mounted with the spherical semiconductors is placed in a predetermined temperature environment.

* * * * *